US012674815B2

(12) United States Patent (10) Patent No.: US 12,674,815 B2

Sato et al. (45) Date of Patent: Jul. 7, 2026

(54) PHYSICAL QUANTITY DETECTOR AND PHYSICAL QUANTITY DETECTION DEVICE

(71) Applicant: SEIKO EPSON CORPORATION, Tokyo (JP)

(72) Inventors: Kenta Sato, Shiojiri (JP); Masayuki Oto, Okaya (JP)

(73) Assignee: SEIKO EPSON CORPORATION (JP)

( * ) Notice: Subject to any disclaimer, the term of this patent is extended or adjusted under 35 U.S.C. 154(b) by 320 days.

(21) Appl. No.: 18/585,481

(22) Filed: Feb. 23, 2024

(65) Prior Publication Data

US 2024/0288466 A1 Aug. 29, 2024

(30) Foreign Application Priority Data

Feb. 24, 2023 (JP) ................................. 2023-027022

(51) Int. Cl.
*G01P 15/08* (2006.01)
*G01P 15/18* (2013.01)

(52) U.S. Cl.
CPC .............. *G01P 15/08* (2013.01); *G01P 15/18* (2013.01)

(58) Field of Classification Search
CPC ................................. G01P 15/08; G01P 15/18
USPC ...................................................... 73/514.01
See application file for complete search history.

(56) References Cited

U.S. PATENT DOCUMENTS

| | | | | |
|---|---|---|---|---|
| 2016/0079954 A1* | 3/2016 | Kameta | ................ | H03H 9/0509 |
| | | | | 310/321 |
| 2018/0267078 A1 | 9/2018 | Sato | | |
| 2019/0277876 A1 | 9/2019 | Sato | | |
| 2023/0032633 A1 | 2/2023 | Sato | | |

FOREIGN PATENT DOCUMENTS

| | | |
|---|---|---|
| JP | 2012-220461 A | 11/2012 |
| JP | 2013-160553 A | 8/2013 |
| JP | 2016-057214 A | 4/2016 |
| JP | 2016-145755 A | 8/2016 |
| JP | 2018-155531 A | 10/2018 |
| JP | 2019-158475 A | 9/2019 |
| JP | 2023-018834 A | 2/2023 |

* cited by examiner

*Primary Examiner* — Peter J Macchiarolo
*Assistant Examiner* — Rodney T Frank
(74) *Attorney, Agent, or Firm* — Harness, Dickey & Pierce, P.L.C.

(57) ABSTRACT

A physical quantity detector includes a base member, a movable part coupled to the base member, a physical quantity detection element which is attached to the base member and the movable part, and which detects a physical quantity caused by a stress according to a displacement of the movable part, a supporter configured to support the base member, and a weight bonded to a principal surface of the movable part, wherein the weight includes a main body overlapping the movable part and the supporter when viewed from a perpendicular direction of the principal surface, and a first protrusion which protrudes from the main body toward the movable part, and which is bonded to the movable part, and the main body and the first protrusion are disposed integrally with each other.

8 Claims, 6 Drawing Sheets

PHYSICAL QUANTITY DETECTOR AND PHYSICAL QUANTITY DETECTION DEVICE

The present application is based on, and claims priority from JP Application Serial Number 2023-027022, filed Feb. 24, 2023, the disclosure of which is hereby incorporated by reference herein in its entirety.

BACKGROUND

1. Technical Field

The present disclosure relates to a physical quantity detector and a physical quantity detection device.

2. Related Art

In JP-A-2013-160553 (Document 1), there is disclosed a physical quantity detector provided with a cantilever having a movable part which is displaced in accordance with a change in a physical quantity, a physical quantity detection element for detecting the physical quantity in accordance with the displacement of the movable part, a mass part arranged in the movable part, and a spacer for bonding the movable part and the mass part to each other. In the physical quantity detector disclosed in Document 1, a gap between the movable part and the physical quantity part is ensured by the thickness of the spacer.

However, in the physical quantity detector disclosed in Document 1, since the mass part is bonded to the movable part via the spacer, it is necessary to perform bonding processing twice, namely processing for bonding the movable part and the spacer to each other, and processing for bonding the spacer and the mass part to each other, in order to bond the mass part to the movable part.

SUMMARY

A physical quantity detector according to an aspect of the present disclosure includes a base member, a movable part coupled to the base member, a physical quantity detection element which is attached to the base member and the movable part, and which detects a physical quantity caused by a stress according to a displacement of the movable part, a supporter configured to support the base member, and a weight bonded to a principal surface of the movable part, wherein the weight includes a main body overlapping the movable part and the supporter when viewed from a perpendicular direction of the principal surface, and a first protrusion which protrudes from the main body toward the movable part, and which is bonded to the movable part, and the main body and the first protrusion are disposed integrally with each other.

A physical quantity detection device according to another aspect of the present disclosure includes the physical quantity detector described above, and a processing circuit configured to calculate the physical quantity based on an output signal of the physical quantity detector.

DESCRIPTION OF EXEMPLARY EMBODIMENTS

Some preferred embodiments of the present disclosure will hereinafter be described in detail using the drawings. It should be noted that the embodiments described hereinafter do not unreasonably limit the contents of the present disclosure as set forth in the appended claims. Further, all of the constituents described hereinafter are not necessarily essential elements of the present disclosure.

1. First Embodiment

1.1. Physical Quantity Detector

Figure 1:
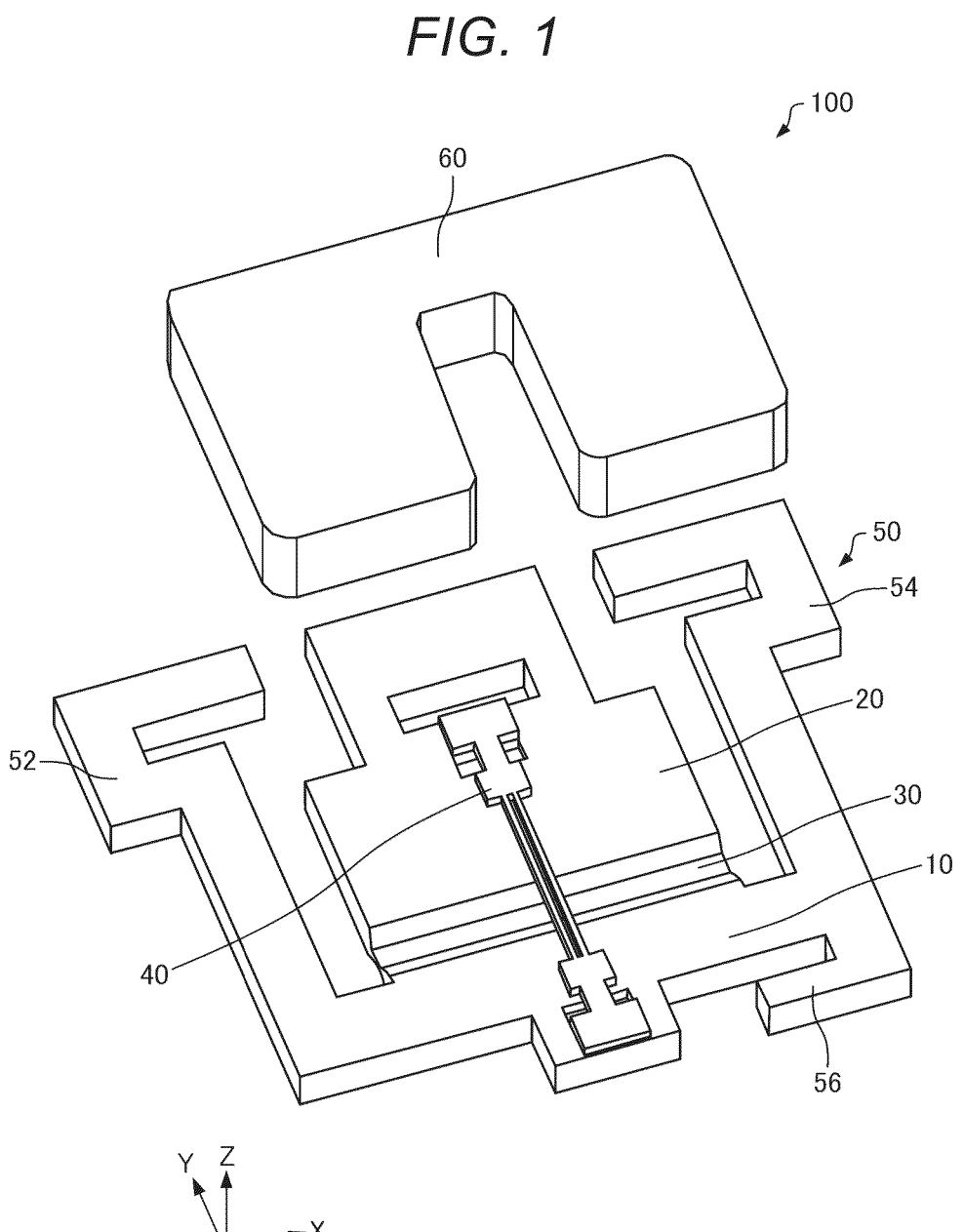
FIG. 1 is a perspective view schematically showing a physical quantity detector according to a first embodiment.
Figure 2:
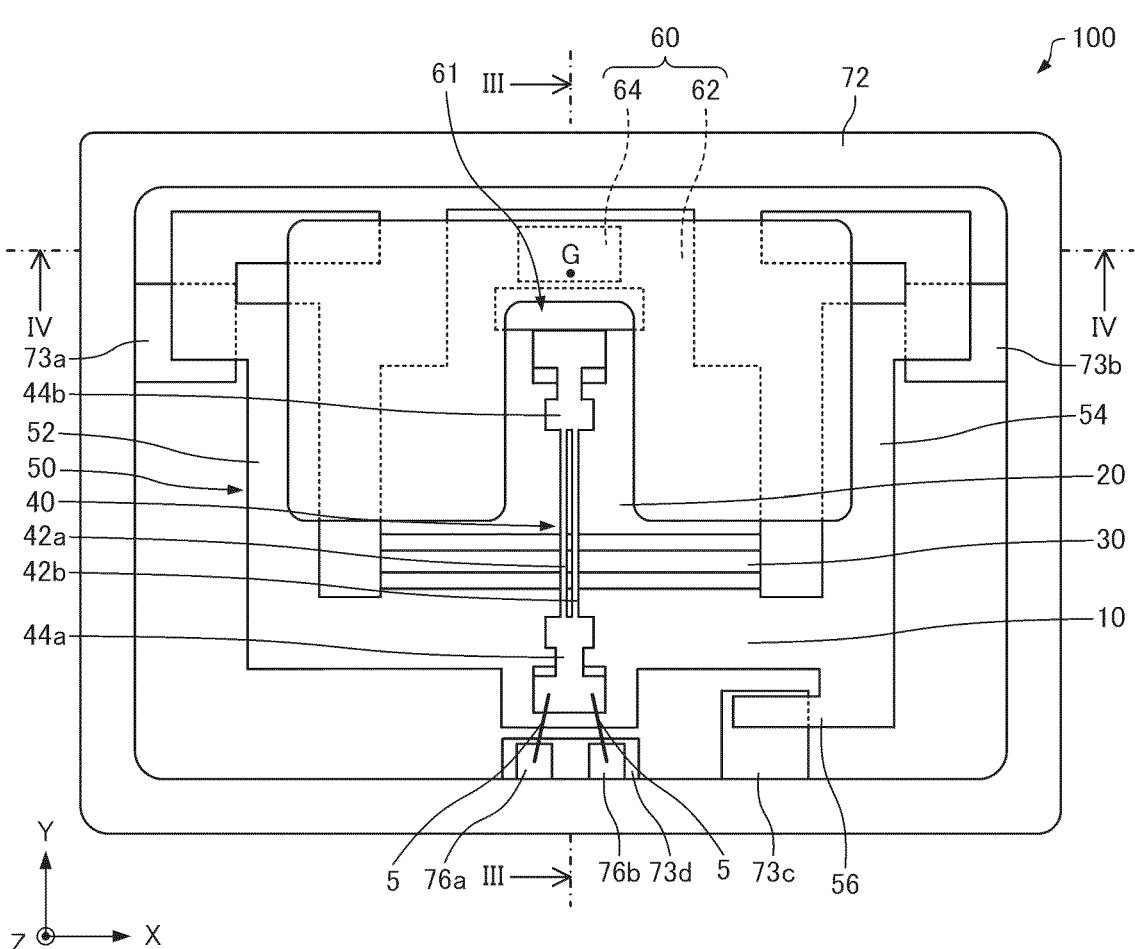
FIG. 2 is a plan view schematically showing the physical quantity detector according to the first embodiment.
Figure 3:
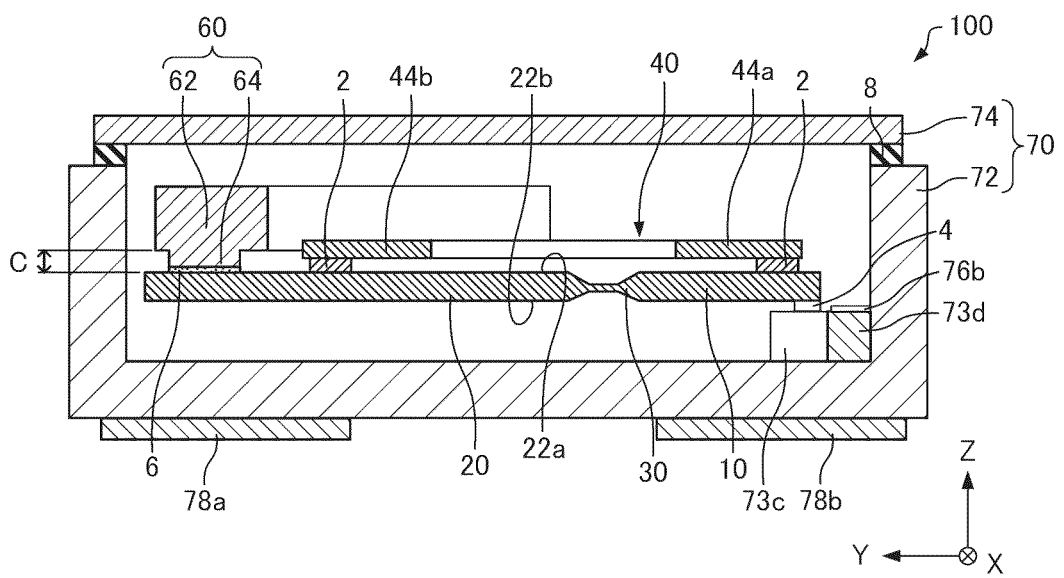
FIG. 3 is a cross-sectional view schematically showing the physical quantity detector according to the first embodiment.
Figure 4:
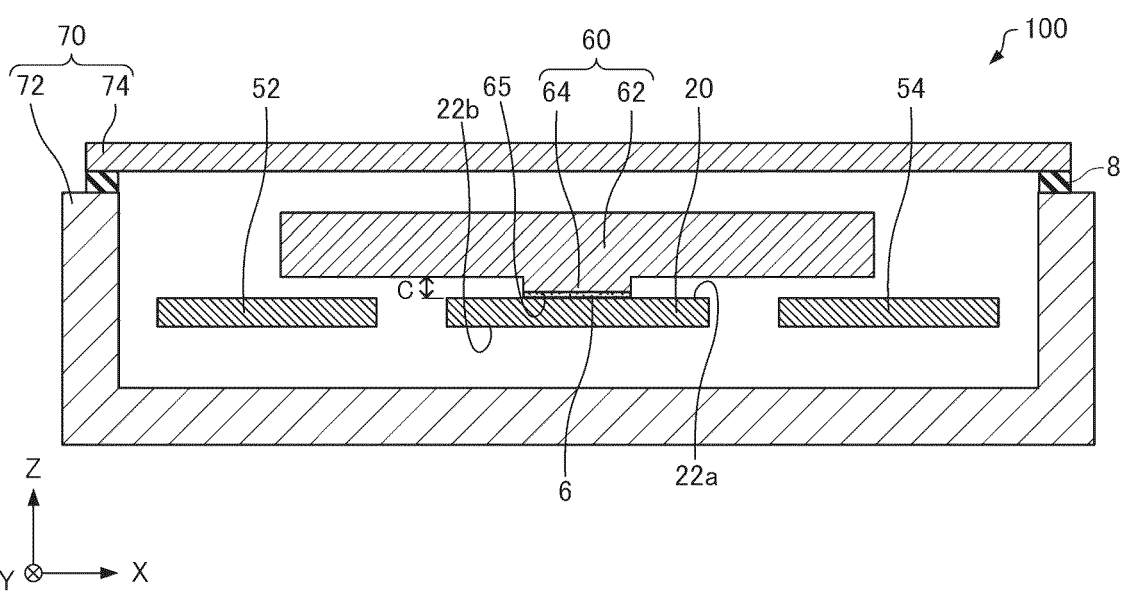
FIG. 4 is a cross-sectional view schematically showing the physical quantity detector according to the first embodiment.

First, a physical quantity detector according to a first embodiment will be described with reference to the drawings. FIG. 1 is a perspective view schematically showing a physical quantity detector 100 according to the first embodiment. FIG. 2 is a plan view schematically showing the physical quantity detector 100 according to the first embodiment. FIG. 3 and FIG. 4 are each a cross-sectional view schematically showing the physical quantity detector 100 according to the first embodiment. It should be noted that FIG. 3 is a cross-sectional view along the line III-III shown in FIG. 2. Further, FIG. 4 is a cross-sectional view along the line IV-IV shown in FIG. 2. In FIG. 1 through FIG. 4, there are illustrated an X axis, a Y axis, and a Z axis as three axes perpendicular to each other.

As shown in FIG. 1 through FIG. 4, the physical quantity detector 100 is provided with a base member 10, a movable part 20, a constricted portion 30 (flexure pivot), a physical quantity detection element 40, a supporter 50, a weight 60, and a package 70. It should be noted that in FIG. 1, the package 70 is omitted from the illustration for the sake of convenience.

The base member 10, the movable part 20, the constricted portion 30, and the supporter 50 are formed of a quartz crystal substrate. The base member 10, the movable part 20, the constricted portion 30, and the supporter 50 are integrally disposed. In other words, the base member 10, the movable part 20, the constricted portion 30, and the supporter 50 are monolithically formed of a single quartz crystal substrate.

The base member 10 has a rectangular shape when viewed from the thickness direction of the base member 10, namely when viewed from a direction along the Z axis. To the base member 10, there are coupled the constricted portion 30 and the supporter 50.

The movable part 20 is displaced along the Z axis in accordance with a physical quantity such as acceleration or pressure. The movable part 20 is coupled to the base member 10 via the constricted portion 30. The movable part 20 is displaced taking the constricted portion 30 as a pivot point. The movable part 20 and the constricted portion 30 constitute a cantilever displaced in accordance with the physical quantity. The movable part 20 has a plate-like shape. The movable part 20 has a first principal surface 22a, and a second principal surface 22b having an obverse-reverse relationship with the first principal surface 22a. The first principal surface 22a is a surface facing to a +Z direction, and the second principal surface 22b is a surface facing to a −Z direction.

The constricted portion 30 is arranged between the base member 10 and the movable part 20. The constricted portion 30 couples the base member 10 and the movable part 20 to each other. The constricted portion 30 is thinner than the base member 10 and the movable part 20. In the illustrated example, by forming a groove along the X axis, the constricted portion 30 is formed thinner than the base member 10 and the movable part 20. By the constricted portion 30 functioning as a hinge, it is possible to make the movable part 20 easy to be displaced.

The physical quantity detection element 40 is bonded to the base member 10 and the movable part 20 so as to straddle the constricted portion 30. The physical quantity detection element 40 is provided with a first vibrating beam 42a, a second vibrating beam 42b, a first vibrating base 44a, and a second vibrating base 44b. The first vibrating beam 42a and the second vibrating beam 42b extend in a direction connecting the base member 10 and the movable part 20, and make a flexural vibration in a direction perpendicular to that connecting direction. Specifically, the first vibrating beam 42a and the second vibrating beam 42b extend along the Y axis, and make a flexural vibration along the Y axis. The first vibrating base 44a is bonded to the base member 10 with a bonding member 2 such as an adhesive. The second vibrating base 44b is bonded to the movable part 20 with the bonding member 2. The first vibrating base 44a is arranged in an end portion in the +Y direction of the first vibrating beam 42a and an end portion in the +Y direction of the second vibrating beam 42b, and the second vibrating base 44b is arranged in an end portion in the −Y direction of the first vibrating beam 42a and an end portion in the −Y direction of the second vibrating beam 42b. The physical quantity detection element 40 is a double tuning-fork type quartz crystal vibrator. The physical quantity detection element 40 detects, for example, acceleration or pressure as the physical quantity.

It should be noted that the physical quantity detection element 40 is not limited to the double tuning-fork type quartz crystal vibrator. For example, the material of the physical quantity detection element 40 is not limited to the quartz crystal, but can be a piezoelectric material such as lithium tantalate ($SiO_3$), lithium tetraborate ($Li_2B_4O_7$), lithium niobate ($LiNbO_3$), lead zirconium titanate (PZT), zinc oxide (ZnO), or aluminum nitride (AlN), or a semiconductor material such as silicon provided with a piezoelectric substance such as zinc oxide (ZnO) or aluminum nitride (AlN) as a membrane.

The supporter 50 supports the base member 10. The supporter 50 has a first support arm 52, a second support arm 54, and a third support arm 56. The first support arm 52, the second support arm 54, and the third support arm 56 are each coupled to the base member 10. Between the first support arm 52 and the second support arm 54, there is arranged the movable part 20. The first support arm 52 is bonded to a first pedestal 73a of a base 72. The second support arm 54 is bonded to a second pedestal 73b of the base 72. The third support arm 56 is bonded to a third pedestal 73c of the base 72. In the example shown in FIG. 3, the third support arm 56 is bonded to the third pedestal 73c with a bonding member 4 such as an adhesive.

The first support arm 52 is curved. Therefore, it is possible to elongate the length of the first support arm 52 while suppressing the spread in the X-Y plane. Similarly, since the second support arm 54 is curved, it is possible to elongate the length of the second support arm 54. Similarly, since the third support arm 56 is curved, it is possible to elongate the length of the third support arm 56. As described above, since the first support arm 52, the second support arm 54, and the third support arm 56 become easy to deform by elongating the length of the first support arm 52, the length of the second support arm 54, and the length of the third support arm 56, it is possible to effectively ease an impact applied from the outside and stress strain.

It should be noted that the number and the arrangement of the support arms provided to the supporter 50 are not particularly limited, and the number of the support arms can be no larger than two, or can be no smaller than four. Further, the shape of the supporter 50 is not limited to the arm-like shape described above, but can also be, for example, a frame-like shape.

The weight 60 is bonded to the first principal surface 22a of the movable part 20. The weight 60 is arranged at a free-end side of the movable part 20. By arranging the weight 60 in the movable part 20, the movable part 20 becomes easy to be displaced even in response to a small amount of physical quantity, and thus, the resolution of the physical quantity detector 100 increases. The weight 60 is formed of a metal material such as copper (Cu), gold (Au), tungsten (W), or a variety of alloys.

The weight 60 has a main body 62 and a first protrusion 64. The main body 62 overlaps the movable part 20 and the supporter 50 when viewed from a perpendicular direction of the first principal surface 22a, namely when viewed from a direction along the Z axis. As shown in FIG. 4, an end portion in the −X direction of the main body 62 overlaps the first support arm 52. Further, an end portion in the +X direction of the main body 62 overlaps the second support arm 54. The main body 62 and the first support arm 52 are opposed to each other via a gap. The main body 62 and the second support arm 54 are opposed to each other via a gap. Since the main body 62 overlaps the first support arm 52 and the second support arm 54, when the movable part 20 is displaced toward the −Z direction, the main body 62 makes contact with the first support arm 52 and the second support arm 54, and the displacement of the movable part 20 is regulated. In other words, the weight 60 functions as a stopper for regulating the excessive displacement toward the −Z direction of the movable part 20.

The first protrusion 64 protrudes from the main body 62 toward the movable part 20. In the illustrated example, the first protrusion 64 protrudes from the main body 62 toward the −Z direction. The first protrusion 64 protrudes from a portion of the main body 62, the portion overlapping the movable part 20. The first protrusion 64 has a bonding surface 65 to be bonded to the movable part 20. The bonding surface 65 of the first protrusion 64 is located on the tip of the first protrusion 64. The bonding surface 65 of the first protrusion 64 is bonded to the first principal surface 22a of the movable part 20. The bonding surface 65 of the first protrusion 64 and the first principal surface 22a of the movable part 20 is bonded with, for example, an adhesive 6 such as epoxy resin.

The first protrusion 64 defines a gap C between the movable part 20 and the main body 62. The size of the gap C between the movable part 20 and the main body 62 is determined by the size in the protruding direction of the first protrusion 64. The size of the gap C is, for example, 80 μm. When bonding the first protrusion 64 and the movable part 20 to each other with the adhesive 6, the size of the gap C becomes a sum of the size in the protruding direction of the first protrusion 64 and the thickness of the adhesive 6. By the size of the gap C, the size of the gap between the main body 62 and the first support arm 52, and the size of the gap between the main body 62 and the second support arm 54 are determined.

The main body 62 and the first protrusion 64 are disposed integrally with each other. In other words, the main body 62 and the first protrusion 64 are monolithically formed of the same material. For example, by pressing the metal material against a metal mold, it is possible to integrally form the main body 62 and the first protrusion 64 with each other. Further, it is possible to integrally form the main body 62 and the first protrusion 64 with each other by, for example, filling the metal mold with metal powder to perform molding, and then sintering the result. The weight 60 can be formed by cutting work.

The first protrusion 64 overlaps the centroid G of the weight 60 when viewed from the perpendicular direction of the first principal surface 22a of the movable part 20. By arranging the first protrusion 64 at a position overlapping the centroid G of the weight 60, it is possible to reduce the moment of the force applied to the movable part 20.

The weight 60 is provided with a cutout 61. By providing the cutout 61 to the weight 60, the weight 60 and the physical quantity detection element 40 fail to overlap each other.

As shown in FIG. 2 through FIG. 4, the package 70 is provided with the base 72 and a lid 74. It should be noted that in FIG. 2, the lid 74 is omitted from the illustration for the sake of convenience.

The base 72 is formed of, for example, ceramics. The base 72 is provided with a recess. The base 72 is provided with the first pedestal 73a, the second pedestal 73b, the third pedestal 73c, and a fourth pedestal 73d. To the first pedestal 73a, there is bonded the first support arm 52. To the second pedestal 73b, there is bonded the second support arm 54. To the third pedestal 73c, there is bonded the third support arm 56. In the fourth pedestal 73d, there are arranged a first inner terminal 76a and a second inner terminal 76b. The first inner terminal 76a and the second inner terminal 76b are electrically coupled to the physical quantity detection element 40 via wires 5.

On the outer surface of the base 72, there are arranged a first outer terminal 78a and a second outer terminal 78b. The first outer terminal 78a is electrically coupled to the first inner terminal 76a via an interconnection not shown provided to the base 72. The second outer terminal 78b is electrically coupled to the second inner terminal 76b via an interconnection not shown provided to the base 72. Therefore, the electrical coupling between external equipment and the physical quantity detection element 40 becomes possible via the first outer terminal 78a and the second outer terminal 78b.

The lid 74 closes the opening of the recess of the base 72. The lid 74 is, for example, a plate-like member. The lid 74 is bonded to the base 72 via a bonding member 8. The lid 74 is formed of a metal material such as Kovar.

The base 72 and the lid 74 form a space for housing the base member 10, the movable part 20, the constricted portion 30, the physical quantity detection element 40, the supporter 50, and the weight 60. The space formed of the base 72 and the lid 74 is in, for example, a reduced-pressure state.

In the physical quantity detector 100, the movable part 20 is displaced along the Z axis taking the constricted portion 30 as the pivot point in accordance with the physical quantity such as acceleration or pressure. As a result, the stress corresponding to the displacement of the movable part 20 is applied to the physical quantity detection element 40 which is bonded to the base member 10 and the movable part 20 so as to straddle the constricted portion 30. The vibrational frequency of the physical quantity detection element 40 changes in accordance with the stress applied to the physical quantity detection element 40. In the physical quantity detector 100, the physical quantity is detected based on the change in vibrational frequency of the physical quantity detection element 40.

1.2. Method of Manufacturing Physical Quantity Detector

First, a quartz crystal substrate is etched to integrally form the base member 10, the movable part 20, the constricted portion 30, and the supporter 50 with each other.

Then, the physical quantity detection element 40 is prepared. The physical quantity detection element 40 can be manufactured by, for example, etching the quartz crystal substrate to form the first vibrating beam 42a, the second vibrating beam 42b, the first vibrating base 44a, and the second vibrating base 44b, and providing the excitation electrodes to the first vibrating beam 42a and the second vibrating beam 42b.

Then, the physical quantity detection element 40 is bonded to the base member 10 and the movable part 20 via the bonding member 2 so as to straddle the constricted portion 30.

Then, the base 72 is prepared, the first support arm 52 is bonded to the first pedestal 73a, the second support arm 54 is bonded to the second pedestal 73b, and the third support arm 56 is bonded to the third pedestal 73c. Then, the physical quantity detection element 40 is electrically coupled to the first inner terminal 76a and the second inner terminal 76b via the wires 5.

Then, the weight 60 is bonded to the movable part 20. Specifically, first, the alignment between the weight 60 and the movable part 20 is adjusted. Then, the bonding surface 65 on the tip of the first protrusion 64 of the weight 60 is bonded to the first principal surface 22a of the movable part 20 via the adhesive 6. Thus, it is possible to form the gap C between the main body 62 and the movable part 20. Due to the steps described above, it is possible to bond the weight 60 to the movable part 20.

In the step of bonding the weight 60 to the movable part 20, the weight 60 is bonded to the movable part 20 so that the main body 62 overlaps the movable part 20, the first support arm 52, and the second support arm 54 when viewed from the perpendicular direction of the first principal surface 22a. Thus, the main body 62 and the first support arm 52 are opposed to each other via a gap. Further, the main body 62 and the second support arm 54 are opposed to each other via a gap. Therefore, it is possible to make the weight 60 function as the stopper for regulating the excessive displacement of the movable part 20 toward the −Z direction.

Here, the first protrusion 64 overlaps the centroid G of the weight 60 when viewed from the perpendicular direction of the first principal surface 22a. Therefore, in the step of bonding the weight 60 to the movable part 20, it is possible to prevent the weight 60 from tilting or falling down when arranging the first protrusion 64 of the weight 60 on the first principal surface 22a of the movable part 20. Therefore, in the step of bonding the weight 60 to the movable part 20, it is possible to easily arrange the weight 60 at a desired position on the first principal surface 22a of the movable part 20 to correctly position the weight 60.

Then, the lid 74 is bonded to the base 72. Due to the steps described hereinabove, it is possible to manufacture the physical quantity detector 100.

1.3. Functions and Advantages

The physical quantity detector 100 is provided with the base member 10, the movable part 20 which is displaced in accordance with the physical quantity, the constricted portion 30 which couples the movable part 20 to the base member 10, the physical quantity detection element 40 which is bonded to the base member 10 and the movable part 20 so as to straddle the constricted portion 30, the supporter 50 for supporting the base member 10, and the weight 60 which is bonded to the first principal surface 22a of the movable part 20. Further, the weight 60 has the main body 62 which overlaps the movable part 20 and the supporter 50 when viewed from the perpendicular direction of the first principal surface 22a, and the first protrusion 64 which protrudes from the main body 62 toward the movable part 20, and which is bonded to the movable part 20 to thereby define the gap C between the movable part 20 and the main body 62. Further, the main body 62 and the first protrusion 64 are disposed integrally with each other. Therefore, in the physical quantity detector 100, it is possible to bond the weight 60 to the movable part 20 in a single bonding step.

For example, when bonding the weight 60 to the movable part 20 via a spacer for defining the gap C between the weight 60 and the movable part 20, there are required two bonding steps, namely a step of bonding the movable part 20 and the spacer to each other and a step of bonding the spacer and the weight 60 to each other. In contrast, in the physical quantity detector 100, since the main body 62 and the first protrusion 64 are disposed integrally with each other, it is possible to bond the weight 60 to the movable part 20 in a single bonding step. Therefore, in the physical quantity detector 100, it is possible to simplify the step of bonding the weight 60 to the movable part 20.

In the physical quantity detector 100, since the number of the bonding steps can be reduced to one, it is possible to reduce the number of alignment steps for bonding the weight 60 to the movable part 20 to one. For example, when bonding the weight 60 to the movable part 20 via the spacer for defining the gap C between the weight 60 and the movable part 20, there are required two alignment steps, namely a step of adjusting the alignment between the movable part 20 and the spacer and a step of adjusting the alignment between the spacer and the weight 60. In contrast, in the physical quantity detector 100, since it is possible to reduce the number of the alignment steps for bonding the weight 60 to the movable part 20 to one, it is possible to simplify the manufacturing process while preventing the degradation of the alignment accuracy.

Therefore, in the physical quantity detector 100, since it is possible to bond the weight 60 to the movable part 20 in a single bonding step, it is possible to make the layer of the adhesive 6 single. For example, when bonding the weight 60 to the movable part 20 via the spacer, the number of layers of the adhesive 6 becomes two. By making the layer of the adhesive 6 single, it is possible to reduce an amount of the adhesive 6 compared to when the number of the layers of the adhesive 6 is two. Here, the linear expansion coefficient of the adhesive such as epoxy resin and the linear expansion coefficient of the quartz crystal are significantly different from each other. Therefore, in the physical quantity detector 100, since it is possible to reduce the amount of the adhesive 6, it is possible to reduce the stress generated in the bonding portion between the weight 60 and the movable part 20.

In the physical quantity detector 100, the supporter 50 is provided with the first support arm 52 and the second support arm 54, and the first support arm 52 and the second support arm 54 overlap the main body 62 when viewed from the perpendicular direction of the first principal surface 22a of the movable part 20. Therefore, in the physical quantity detector 100, it is possible to make the weight 60 function as the stopper for regulating the excessive displacement of the movable part 20 toward the −Z direction. Thus, it is possible to reduce the excessive deformation of the movable part 20.

In the physical quantity detector 100, the first protrusion 64 overlaps the centroid G of the weight 60 when viewed from the perpendicular direction of the first principal surface 22a of the movable part 20. Therefore, in the physical quantity detector 100, it is possible to reduce the moment of the force applied to the movable part 20.

2. Second Embodiment

Figure 5:
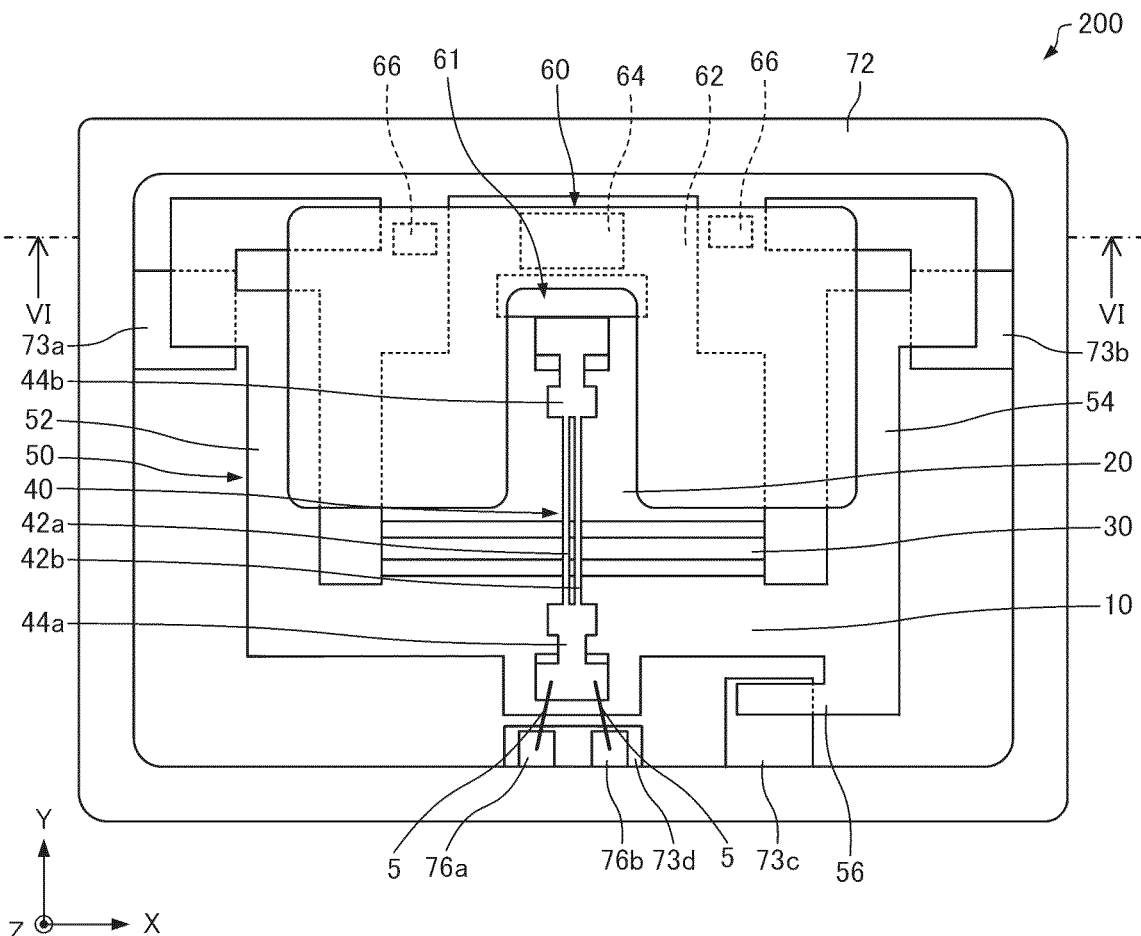
FIG. 5 is a plan view schematically showing a physical quantity detector according to a second embodiment.
Figure 6:
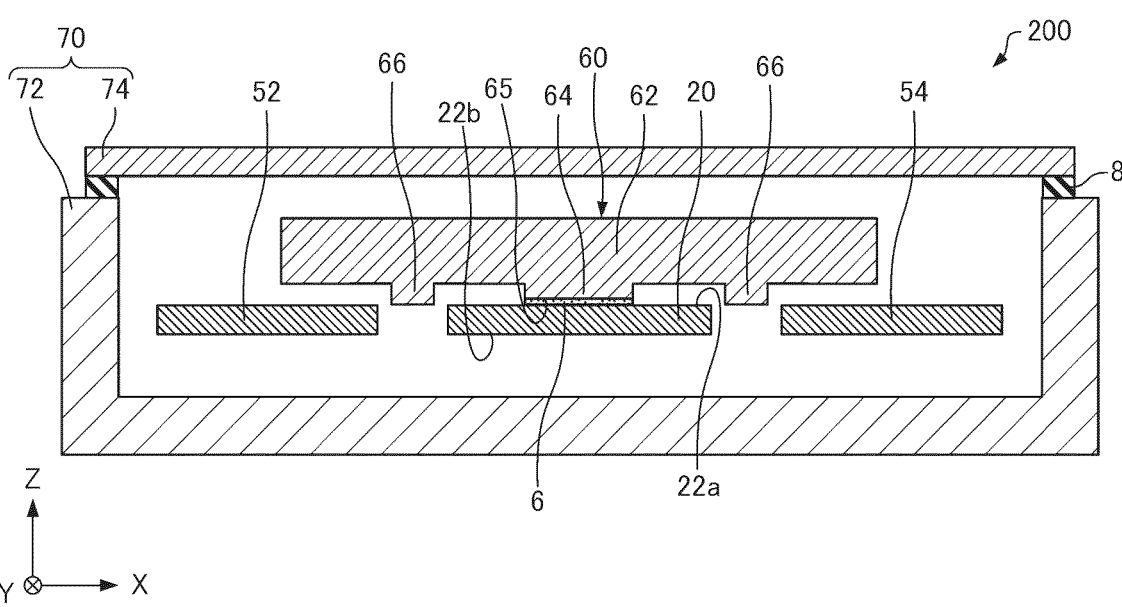
FIG. 6 is a cross-sectional view schematically showing the physical quantity detector according to the second embodiment.

Then, a physical quantity detector according to a second embodiment will be described with reference to the drawings. FIG. 5 is a plan view schematically showing a physical quantity detector 200 according to the second embodiment. FIG. 6 is a cross-sectional view schematically showing the physical quantity detector 200 according to the second embodiment. It should be noted that FIG. 6 is a cross-sectional view along the line VI-VI shown in FIG. 5. Hereinafter, in the physical quantity detector 200 according to the second embodiment, the members having substantially the same functions as those of the constituent members of the physical quantity detector 100 according to the first embodiment described above will be denoted by the same reference symbols, and the detailed descriptions thereof will be omitted.

As shown in FIG. 5 and FIG. 6, in the physical quantity detector 200, the weight 60 has second protrusions 66 protruding toward the same direction as that of the first protrusion 64 in a region which does not overlap the supporter 50 of the main body 62 and the movable part 20 when viewed from the perpendicular direction of the first principal surface 22a of the movable part 20.

In the illustrated example, the weight 60 has the two second protrusions 66. One of the two second protrusions 66 is arranged between the first support arm 52 and the movable part 20 when viewed from the perpendicular direction of the first principal surface 22a. The other of the two second protrusions 66 is arranged between the second support arm 54 and the movable part 20 when viewed from the perpendicular direction of the first principal surface 22*a*. By arranging the second protrusions 66 in regions not overlapping the supporter 50 or the movable part 20 of the main body 62 when viewed from the perpendicular direction of the first principal surface 22*a* of the movable part 20, the second protrusions 66 do not make contact with the supporter 50 and the movable part 20 even when the movable part 20 is displaced.

It should be noted that the positions of the second protrusions 66 are not particularly limited as long as being located in a region not overlapping the supporter 50 of the main body 62 and the movable part 20 when viewed from the perpendicular direction of the first principal surface 22*a*. Further, although the weight 60 has the two protrusions 66 in the illustrated example, it is possible for the weight 60 to have a single second protrusion 66, or to have three or more second protrusions 66.

The first protrusion 64 protrudes toward the −Z direction from the main body 62, and the second protrusions 66 protrude toward the −Z direction from the main body 62. In the direction along the Z axis, the size of the second protrusions 66 is the same as, for example, the size of the first protrusion 64. It should be noted that in the direction along the Z axis, the size of the second protrusions 66 can be smaller than the size of the first protrusion 64, or can also be larger than the size of the first protrusion 64.

The main body 62, the first protrusion 64, and the second protrusions 66 are disposed integrally with each other. In other words, the main body 62, the first protrusion 64, and the second protrusions 66 are monolithically formed of the same material. For example, by pressing the metal material against a metal mold, it is possible to integrally form the main body 62, the first protrusion 64, and the second protrusions 66 with each other. Further, it is possible to integrally form the main body 62, the first protrusion 64, and the second protrusions 66 with each other by, for example, filling the metal mold with metal powder to perform molding, and then sintering the result. The weight 60 can be formed by cutting work. It should be noted that the second protrusions 66 are not required to be disposed integrally with the main body 62 and the first protrusion 64. For example, it is possible for the second protrusions 66 to be bonded to the main body 62 via a bonding material such as an adhesive.

In the physical quantity detector 200, the weight 60 has the second protrusions 66 protruding toward the same direction as that of the first protrusion 64 in the region which does not overlap the supporter 50 of the main body 62 and the movable part 20 when viewed from the perpendicular direction of the first principal surface 22*a*. Therefore, in the physical quantity detector 200, it is possible to make the weight 60 heavier. Therefore, in the physical quantity detector 200, the movable part 20 becomes easy to be displaced even in response to a small amount of the physical quantity, and thus, it is possible to increase the resolution of the physical quantity detector 200. Further, in the physical quantity detector 200, since the second protrusions 66 protrude toward the same direction as that of the first protrusion 64 in the region which does not overlap the supporter 50 of the main body 62 and the movable part 20, it is possible to increase the resolution while achieving a reduction in size.

3. Third Embodiment

Figure 7:
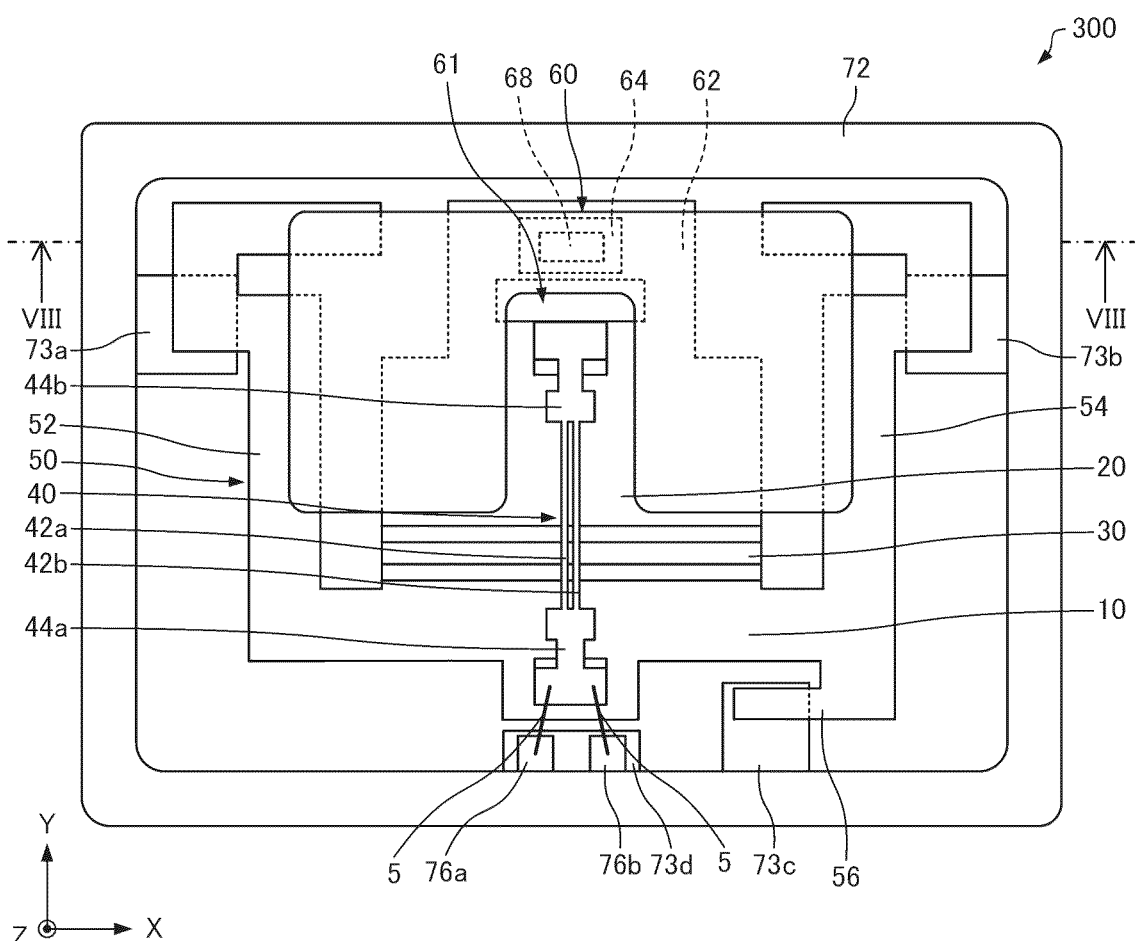
FIG. 7 is a plan view schematically showing a physical quantity detector according to a third embodiment.
Figure 8:
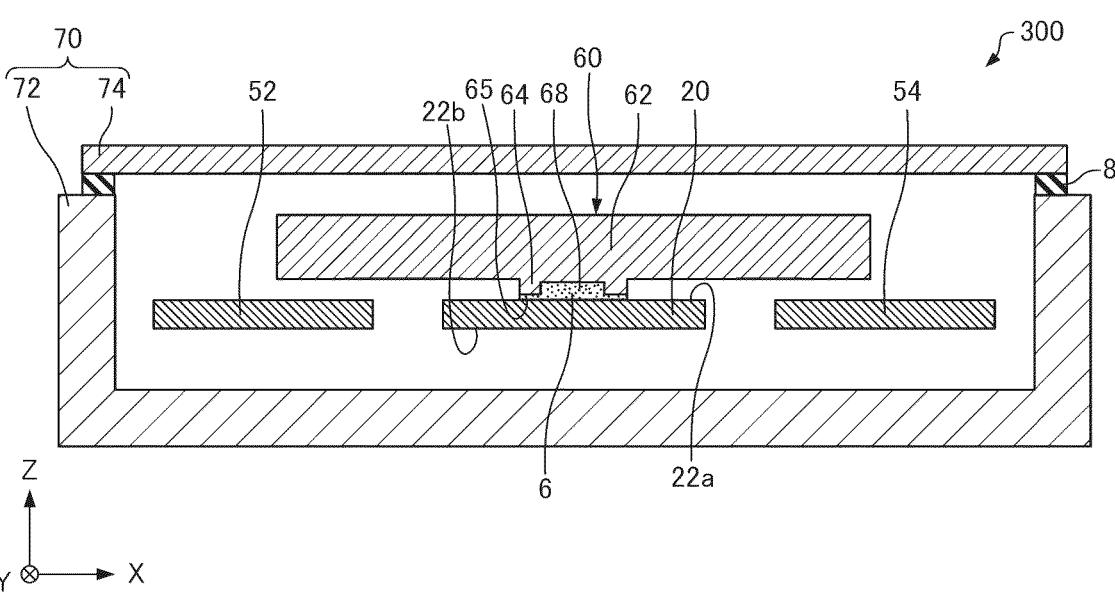
FIG. 8 is a cross-sectional view schematically showing the physical quantity detector according to the third embodiment.

Then, a physical quantity detector according to a third embodiment will be described with reference to the drawings. FIG. 7 is a plan view schematically showing a physical quantity detector 300 according to the third embodiment. FIG. 8 is a cross-sectional view schematically showing the physical quantity detector 300 according to the third embodiment. It should be noted that FIG. 8 is a cross-sectional view along the line VIII-VIII shown in FIG. 7. Hereinafter, in the physical quantity detector 300 according to the third embodiment, the members having substantially the same functions as those of the constituent members of the physical quantity detector 100 according to the first embodiment described above will be denoted by the same reference symbols, and the detailed descriptions thereof will be omitted.

As shown in FIG. 7 and FIG. 8, in the physical quantity detector 300, the first protrusion 64 has the bonding surface 65 to be bonded to the first principal surface 22*a*, and on the bonding surface 65, there is formed a recess 68. The recess 68 is a depression provided to the bonding surface 65. By providing the recess 68 to the bonding surface 65, a surplus of the adhesive 6 enters the recess 68 in the step of bonding the weight 60 to the movable part 20, and therefore, it is possible to reduce runoff of the adhesive 6 from the bonding surface 65.

In the illustrated example, the bonding surface 65 is provided with a single recess 68. It should be noted that a plurality of recesses 68 can be provided to the bonding surface 65.

In the physical quantity detector 300, since the recess 68 is provided to the bonding surface 65, it is possible to reduce the runoff of the adhesive 6 from the bonding surface 65. Therefore, in the physical quantity detector 300, it is possible to reduce the variation of the bonding position and the variation of the bonding area due to the runoff of the adhesive 6.

4. Fourth Embodiment

Figure 9:
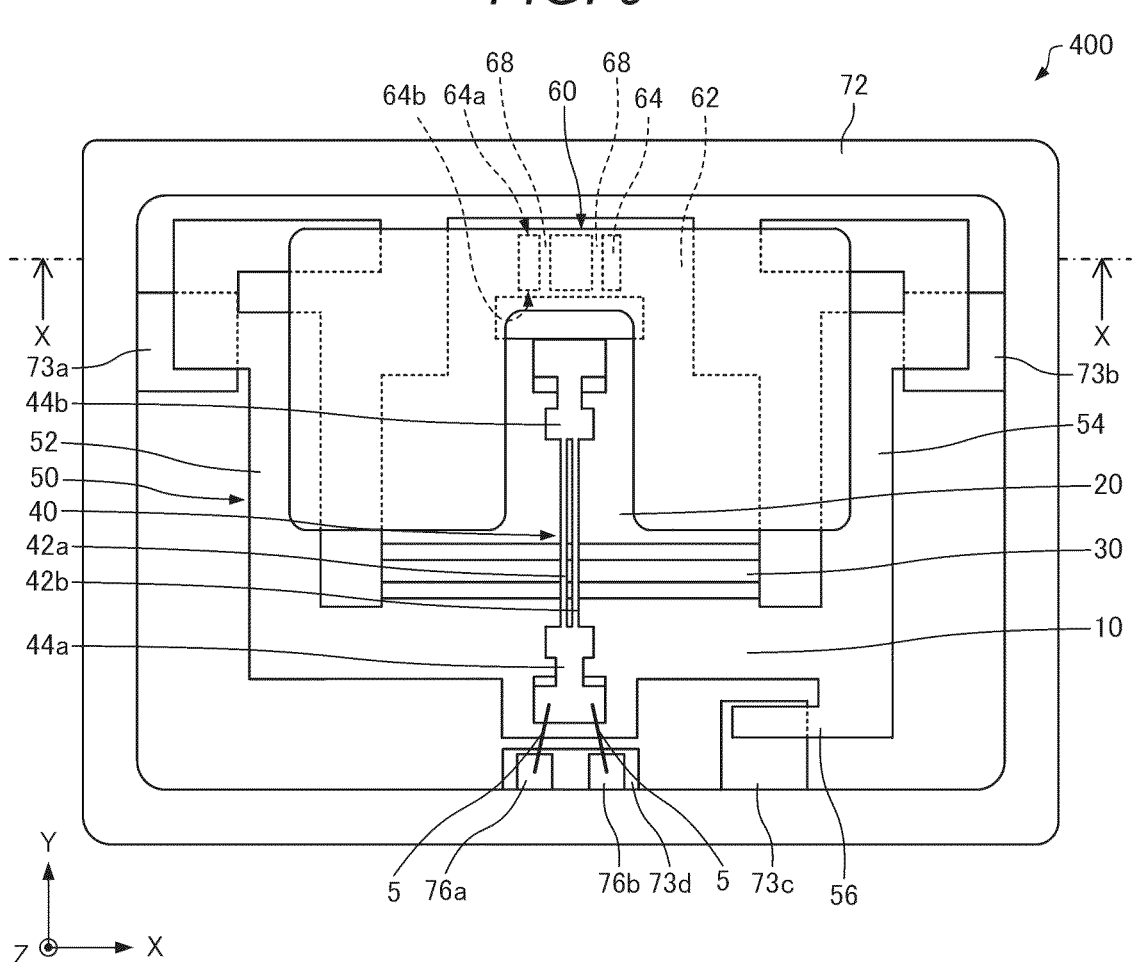
FIG. 9 is a plan view schematically showing a physical quantity detector according to a fourth embodiment.
Figure 10:
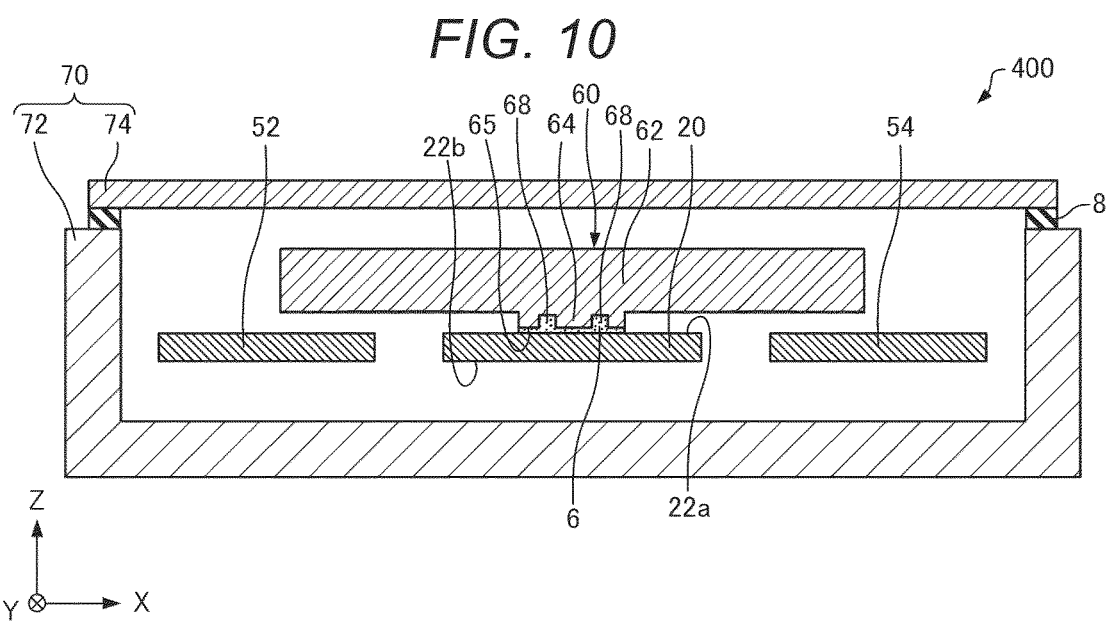
FIG. 10 is a cross-sectional view schematically showing the physical quantity detector according to the fourth embodiment.

Then, a physical quantity detector according to a fourth embodiment will be described with reference to the drawings. FIG. 9 is a plan view schematically showing a physical quantity detector 400 according to the fourth embodiment. FIG. 10 is a cross-sectional view schematically showing the physical quantity detector 400 according to the fourth embodiment. It should be noted that FIG. 10 is a cross-sectional view along the line X-X shown in FIG. 9. Hereinafter, in the physical quantity detector 400 according to the fourth embodiment, the members having substantially the same functions as those of the constituent members of the physical quantity detector 300 according to the third embodiment described above will be denoted by the same reference symbols, and the detailed descriptions thereof will be omitted.

In the physical quantity detector 400, the recesses 68 are each a groove extending along the Y axis. As shown in FIG. 9, the first protrusion 64 has a first side surface 64*a* and a second side surface 64*b*. The groove constituting the recess 68 has one end portion connected to the first side surface 64*a*, and the other end portion connected to the second side surface 64*b*. In other words, the both end portions of the groove constituting the recess 68 are opened. Therefore, in the step of bonding the weight 60 to the movable part 20, it is possible to discharge the air in the recess 68 from the both end portions of the groove when the adhesive 6 enters the recess 68. Therefore, in the physical quantity detector 400, it is possible to make the surplus of the adhesive 6 efficiently enter the recess 68.

The side surfaces of the first protrusion 64 are each a surface having a perpendicular line perpendicular to the protruding direction of the first protrusion 64. The perpendicular line of the first side surface 64*a* and the perpendicular line of the second side surface 64*b* are perpendicular to the protruding direction of the first protrusion 64. In the illustrated example, the protruding direction of the first protrusion 64 is the −Z direction, the perpendicular line of the first side surface 64*a* is parallel to the Y axis, and the perpendicular line of the second side surface 64*b* is parallel to the Y axis. The side surfaces of the first protrusion 64 can each be a curved surface.

Although there are formed the two recesses 68 on the bonding surface 65 in the illustrated example, the number of the recesses 68 is not particularly limited. Further, although the recesses 68 are each the groove having the one end portion connected to the first side surface 64*a* and the other end portion connected to the second side surface 64*b* in the illustrated example, it is possible to adopt a configuration in which the one end portion of the groove alone is connected to the side surface of the first protrusion 64. Further, although the recesses 68 are each the groove extending along the Y axis in the illustrated example, it is possible for each of the recesses 68 to be a groove extending along the X axis.

In the physical quantity detector 400, since the recesses 68 are each the groove having the end portion connected to the side surface of the first protrusion 64, it is possible to discharge the air in the recesses 68 from the end portions of the grooves when the adhesive 6 enters the recesses 68 in the step of bonding the weight 60 to the movable part 20. Therefore, in the physical quantity detector 400, it is possible to make the surplus of the adhesive 6 efficiently enter the recess 68, and thus, it is possible to reduce the variation of the bonding position and the variation of the bonding area due to the runoff of the adhesive 6.

5. Fifth Embodiment

Figure 11:
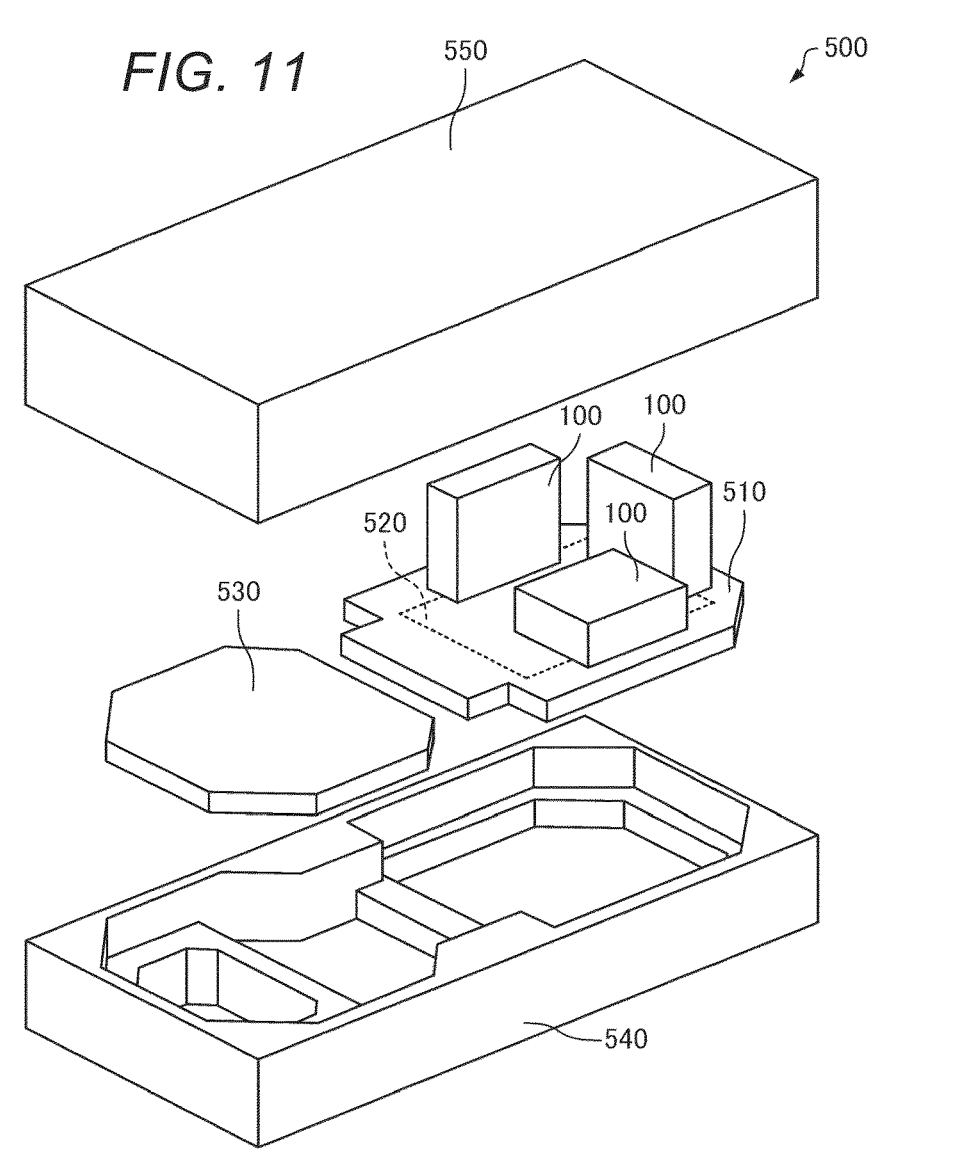
FIG. 11 is a perspective view schematically showing a physical quantity detection device according to a fifth embodiment.

Then, a physical quantity detection device according to a fifth embodiment will be described with reference to the drawing. FIG. 11 is an exploded perspective view schematically showing a physical quantity detection device 500 according to the fifth embodiment.

The physical quantity detection device 500 is provided with three physical quantity detectors 100, a circuit board 510, a processing circuit 520, a connector board 530, a base 540, and a lid 550.

The three physical quantity detectors 100 are mounted on the circuit board 510. Each of the three physical quantity detectors 100 detects the physical quantity along a detection axis. The detection axes of the three physical quantity detectors 100 are perpendicular to each other. The three physical quantity detectors 100 are mounted on the circuit board 510 in the orientations according to the detection axes so as to be able to detect the physical quantity along the detection axes perpendicular to each other. In the physical quantity detection device 500, it is possible to detect the physical quantity along the three axes perpendicular to each other.

On the circuit board 510, there is mounted the processing circuit 520 for calculating the physical quantity based on output signals of the physical quantity detectors 100. The processing circuit 520 is mounted on, for example, a surface at an opposite side to the surface of the circuit board 510 on which the three physical quantity detectors 100 are mounted. The processing circuit 520 calculates the physical quantity along the three detection axes perpendicular to each other based on the output signals of the three physical quantity detectors 100. For example, when the physical quantity detection device 500 is a tiltmeter for outputting a signal corresponding to a tilt angle at a position at which the tiltmeter is installed, the processing circuit 520 calculates the tilt angle based on the output signals of the three physical quantity detectors 100. The processing circuit 520 can be realized by, for example, a general-purpose IC (Integrated Circuit) or an FPGA (Field Programmable Gate Array). The processing circuit 520 is electrically coupled to the connector board 530, and is electrically coupled to external equipment via the connector board 530.

The circuit board 510 on which the three physical quantity detectors 100 and the processing circuit 520 are mounted, and the connector board 530 are housed in the package constituted by the base 540 and the lid 550.

The physical quantity detection device 500 is, for example, a tiltmeter for outputting the signal corresponding to the tilt angle at the position at which the tiltmeter is installed. The physical quantity detection device 500 can be, for example, an IMU (Inertial Measurement Unit) equipped with the three physical quantity detectors 100 for detecting the acceleration in the directions along the three axes, and three angular velocity sensors for detecting the angular velocity around the three axes. Further, the physical quantity detection device 500 can be, for example, a structure monitoring device for monitoring a tilt of a structure using the physical quantity detectors 100. Further, the physical quantity detection device 500 can be a vehicle equipped with the three physical quantity detectors 100 for detecting the acceleration in the directions along the three axes.

It should be noted that the embodiments and the modified examples described above are illustrative only, and the present disclosure is not at all limited to the embodiments and the modified examples described above. For example, it is possible to arbitrarily combine the embodiments and the modified examples with each other.

The present disclosure is not limited to the embodiments described above, but can further variously be modified. For example, the present disclosure includes substantially the same configuration as the configurations described in the embodiments. Substantially the same configuration means a configuration substantially the same in, for example, function, way, and result, or a configuration substantially the same in object and advantage. Further, the present disclosure includes configurations obtained by replacing a non-essential part of the configurations described as the embodiments. Further, the present disclosure includes configurations providing the same functions and the same advantages, or configurations capable of achieving the same object as those of the configurations described as the embodiments. Further, the present disclosure includes configurations obtained by adding a known technology to the configurations described as the embodiments.

The following contents derive from the embodiments and the modified examples described above.

A physical quantity detector according to an aspect of the present disclosure includes a base member, a movable part displaced in accordance with a physical quantity, a constricted portion configured to couple the movable part to the base member, a physical quantity detection element bonded to the base member and the movable part so as to straddle the constricted portion, a supporter configured to support the base member, and a weight bonded to a principal surface of the movable part, wherein the weight includes a main body overlapping the movable part and the supporter when viewed from a perpendicular direction of the principal surface, and a first protrusion which protrudes from the main body toward the movable part, and which is bonded to the movable part to thereby define a gap between the movable part and the main body, and the main body and the first protrusion are disposed integrally with each other.

According to this physical quantity detector, it is possible to bond the weight to the movable part in a single bonding step.

In the aspect of the physical quantity detector described above, the supporter may include a first support arm and a second support arm, and the first support arm and the second support arm may overlap the main body when viewed from a perpendicular direction of the principal surface.

According to this physical quantity detector, it is possible to make the weight function as a stopper for regulating an excessive displacement of the movable part.

In the aspect of the physical quantity detector described above, the weight may have a second protrusion protruding toward a direction same as that of the first protrusion in a region which fails to overlap the supporter of the main body and the movable part when viewed from the perpendicular direction of the principal surface.

According to this physical quantity detector, since it is possible to make the weight heavier, the movable part becomes easy to be displaced even in response to a small amount of the physical quantity, and thus, it is possible to increase the resolution.

In the aspect of the physical quantity detector described above, the first protrusion may have a bonding surface to be bonded to the principal surface, and the bonding surface may be provided with a recess.

According to this physical quantity detector, since the surplus of the adhesive enters the recess in the step of bonding the weight to the movable part, it is possible to reduce the runoff of the adhesive from the bonding surface.

In the aspect of the physical quantity detector described above, the recess may be a groove having an end portion connected to a side surface of the first protrusion.

According to this physical quantity detector, in the step of bonding the weight to the movable part, it is possible to discharge the air inside the recess from the end portion of the groove when the adhesive enters the recess. Therefore, it is possible to make the surplus of the adhesive efficiently enter the recess.

A physical quantity detection device according to an aspect of the present disclosure includes the physical quantity detector described above, and a processing circuit configured to calculate the physical quantity based on an output signal of the physical quantity detector.

What is claimed is:

1. A physical quantity detector comprising:
a base member;
a movable part coupled to the base member;

a physical quantity detection element which is attached to the base member and the movable part, and which detects a physical quantity caused by a stress according to a displacement of the movable part;
a supporter configured to support the base member; and
a weight bonded to a principal surface of the movable part, wherein the weight includes a main body overlapping the movable part and the supporter when viewed from a perpendicular direction of the principal surface, and a first protrusion which protrudes from the main body toward the movable part, and which is bonded to the movable part, and the main body and the first protrusion are disposed integrally with each other.

2. The physical quantity detector according to claim 1, wherein the supporter includes a first support arm and a second support arm, and the first support arm and the second support arm overlap the main body when viewed from a perpendicular direction of the principal surface.

3. The physical quantity detector according to claim 1, wherein the weight includes a second protrusion protruding toward a direction same as that of the first protrusion in a region which fails to overlap the supporter of the main body and the movable part when viewed from the perpendicular direction of the principal surface.

4. The physical quantity detector according to claim 1, wherein the first protrusion includes a bonding surface to be bonded to the principal surface, and the bonding surface is provided with a recess.

5. The physical quantity detector according to claim 4, wherein the recess is a groove having an end portion connected to a side surface of the first protrusion.

6. The physical quantity detector according to claim 1, wherein the first protrusion overlaps a centroid of the weight when viewed from the perpendicular direction of the principal surface.

7. The physical quantity detector according to claim 1, wherein the base member and the movable part are coupled to each other via a constricted portion.

8. A physical quantity detection device comprising:
the physical quantity detector according to claim 1; and
a processing circuit configured to calculate the physical quantity based on an output signal of the physical quantity detector.

* * * * *